United States Patent [19]
Gause et al.

[11] 3,750,479
[45] Aug. 7, 1973

[54] TILTING TABLE FOR ERGOMETER AND FOR OTHER BIOMEDICAL DEVICES

[75] Inventors: Raymond L. Gause; Raymond A. Spier, both of Huntsville, Ala.

[73] Assignee: The United States of America as represented by the National Aeronautics and Space Administration

[22] Filed: May 8, 1972

[21] Appl. No.: 251,609

[52] U.S. Cl. ............................................... 73/379
[51] Int. Cl. ........................................... G01l 5/02
[58] Field of Search .................. 73/379; 272/73, 57; 128/24 R, 25 R

[56] References Cited
UNITED STATES PATENTS
3,057,201  10/1962  Jaeger ................................... 73/379
3,662,747  5/1972  Williams .......................... 128/24 R Primary Examiner—Charles A. Ruehl
Attorney—L. D. Wofford, Jr., J. R. Manning, et al.

[57] ABSTRACT

The apparatus is for testing the human body in a variety of positions, ranging from the vertical to the supine, while exercising on an ergometer; and can also be used for angular positioning of other biomedical devices. It includes a floor plate and a hinged plate upon which to fix the ergometer, a back rest and a head rest attached at right angles to said hinged plate and behind the seat of the ergometer, dual hydraulic cylinders for raising and lowering the hinged plate through 90° by means of a self contained hydraulic system, with valve means for control and positive stops on the apparatus to prevent over travel. Tests can be made with the subject positioned on the seat of the ergometer, through the various angles, with a substantially normal body attitude relative to said seat and ergometer.

9 Claims, 5 Drawing Figures

TILTING TABLE FOR ERGOMETER AND FOR OTHER BIOMEDICAL DEVICES

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The invention relates in general to devices for testing the human body, and it deals more particularly with apparatus designed for testing the human body in a variety of positions ranging from vertical to supine while exercising on the ergometer. It may also be used for angular positioning of other biomedical devices. It is necessary in preparation for manned space flight to determine the effects upon the human body of work performed by the body in the different attitudes which may be assumed during space flight or while working in space such as those environmental conditions which might be experienced in a space station. Various tests need to be performed upon the subject, such as rate of heart beat, oxygen consumption, metabolism, blood circulation, and the like. For these purposes, it is necessary that the body of the subject be maintained in substantially a normal attitude assumed relative to the work to be performed. It is often also necessary that the testing devices themselves be maintained in a relative position of this kind during the tests being performed. No existing equipment of this type is known. Previous methods involved the clamping of the base of the ergometer to a wall or against a table. The disadvantage of this method is that the operator can exercise only in the normal position or in the supine position with his back on the floor, but with the attitude of the body relative to the testing equipment in obviously an abnormal position.

2. Discussion of Prior Art

After competent search, no existing devices of this type were found, there being two references which were considered, but which do not appear to conflict with the present invention or anticipate either the apparatus or the objects and purposes for which it was designed. The prior art discloses the following United States Patents:

T. S. Swarts     3,189,344
S. Jaffe     3,058,742

Swarts discloses a body exerciser including a back rest plate 42 and a seat plate 36 which are hinged together at 46, and are angularly adjustable mechanically. This device is purely designed for the purpose of exercising the body. The Swarts patent states on page 1, column 2, lines 37–45, that the area of the spine and the stomach muscles are exercied by the movement of the person rocking back and forth, lowering and elevating the hinge connection 46 between the seat and back rest. It is stated that this exercises the legs and stomach muscles and simultaneously massages the back in the area of the spine base, by "virtue of the relative movement between the back and the thickened portion 48 of the back rest padding."

This is the very condition which the applicants here wish to avoid. This is a complete change in the body attitude relative to the exercising apparatus, thereby placing abnormal conditions of strain and tension on the body organs.

The patent to Jaffe discloses a body muscle building machine which has pedals and can be used while seated on the floor, or in a chair or lying down. Again, the subject, while resting on the fabric 20, attempting to assume various angles of body elevation relative to the exercising pedals, will completely change his body attitude relative to the exercising device. Neither of these references contemplated in any way the combination of mechanical parts arranged and fixed so that the subject was indexed into a stable position without regard to being horizontal or vertical, or in between the two, and therefore the test data with regard to heart rate, oxygen consumption, blood circulation, and the like, would be in terms different due to the variances in the angular strain placed upon the various organs of the body as it is shifted in its attitude relative to the exercising means.

Neither of these references show a device which would serve or could be adapted to serve the need of the applicants nor is there a suggestion of any such device, such as the one indicated in the present invention, wherein the body attitude relative to the testing equipment is not changed as the apparatus is positioned through the various angles with the body of the subject indexed into the same relative position with regard to the testing apparatus, without additional strain induced by the changing angular position of the body.

SUMMARY AND OBJECTS OF THE INVENTION

The primary object of this invention is to provide apparatus for testing the human body while exercising in a variety of positions, ranging from the vertical to the supine.

A salient feature in connection therewith is the provision of an adjustable platform which will selectively position the test subject and testing apparatus at various predetermined angles.

A further important object is to provide angularly adjustable apparatus for testing the human body in such varied positions without the introduction of external stress factors unrelated to the primary test of the factor imposed by angularity.

A feature of importance, therefore, is the provision in the present invention of a tilting table to accommodate the test subject and the exercise apparatus, or other biomedical device, positioned operable through a variety of angles; wherein the body attitude of the test subject relative to the testing equipment is not changed as the apparatus is thus moved through the various angles, but indexed into the same relative position without additional strain induced by a change of position.

In effect, we have provided apparatus, for testing certain body functions, such as heart rate, oxygen consumption, blood circulation and metabolic changes, and the like, wherein a human subject may assume a fixed body attitude relative to the test equipment. The subject may then be positioned, along with his test equipment, through various angles, from vertical to supine, without changing the body attitude relative to the equipment, free of angular strains which would be encountered in such attitude change; and true measurements may be made of changes in body functions due solely to the effect of the change of the total body angle.

It can readily be seen that this can be of prime importance in testing the body in a weightless atmosphere, such as might be encountered in space exploration; and such experiments as may be conducted in a space laboratory.

It then becomes a further object to provide means whereby the apparatus may be controlled such that the subject may angle himself over the range, or the same may be accomplished by remote controls or by an automatic programmed control system.

A feature of the invention resides in a two-way hydraulic valve system to control angularity by minimal movements of the test subject to change his position, as well as the provision of remote control or programmed means for such purpose. The apparatus can be used with the ergometer as herein shown, but it can be employed with other biomedical devices, such as the LBNPD, etc.

All of the foregoing show the test subject as seated (in dotted lines) and indexed in fixed position relative to the equipment.

Figures 2, 4, 5:
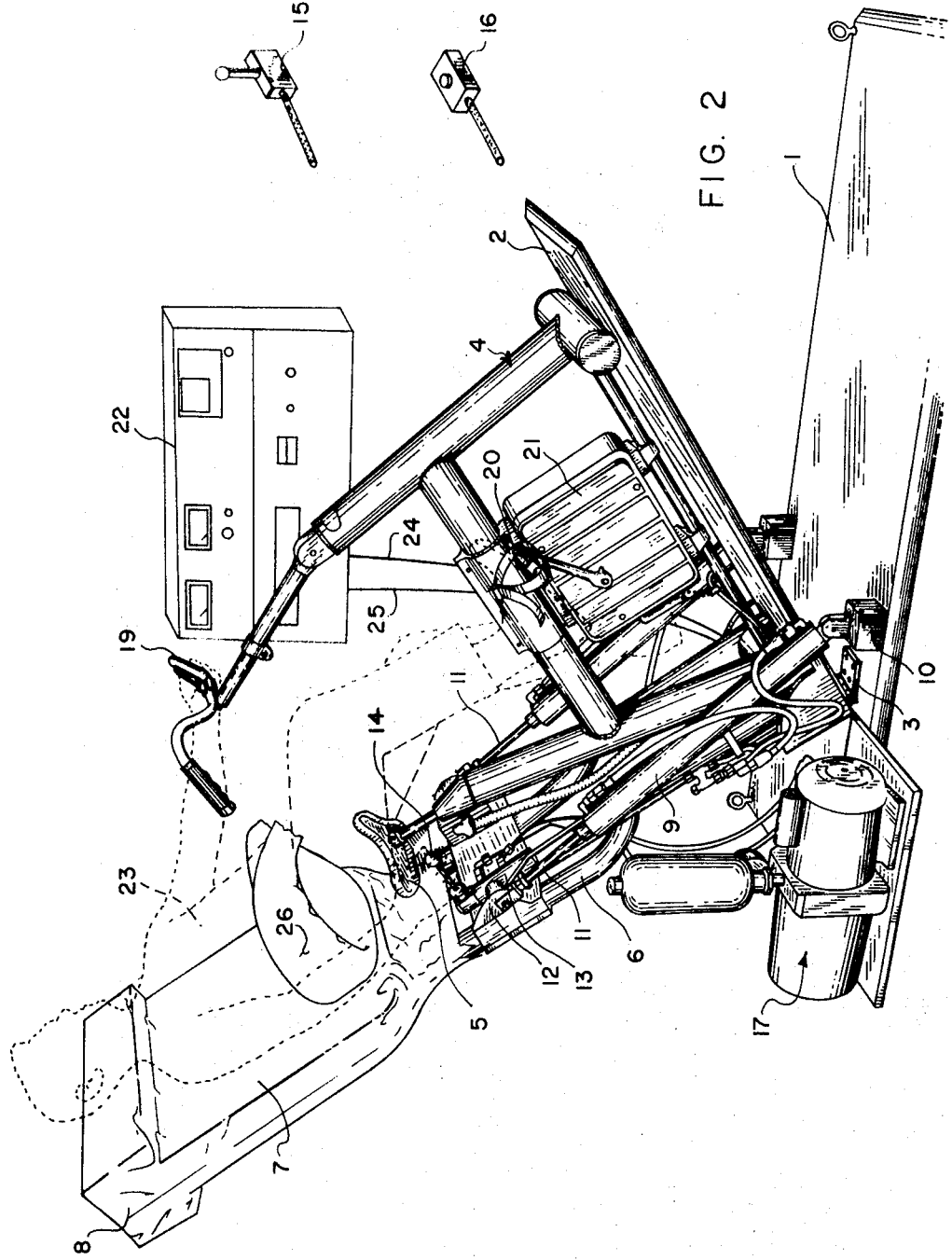
FIG. 2 is a side view of the Tilting Table, showing the device in an angular position relative to the horizontal.

FIG. 4 is a diagrammatic illustration of a remote control switch which can be substituted for the subject operated hand switch toggle.

FIG. 5 is a diagrammatic illustration of an automatic programmed control which can be similarly substituted.

DETAILED DESCRIPTION OF THE INVENTION

Figure 1:
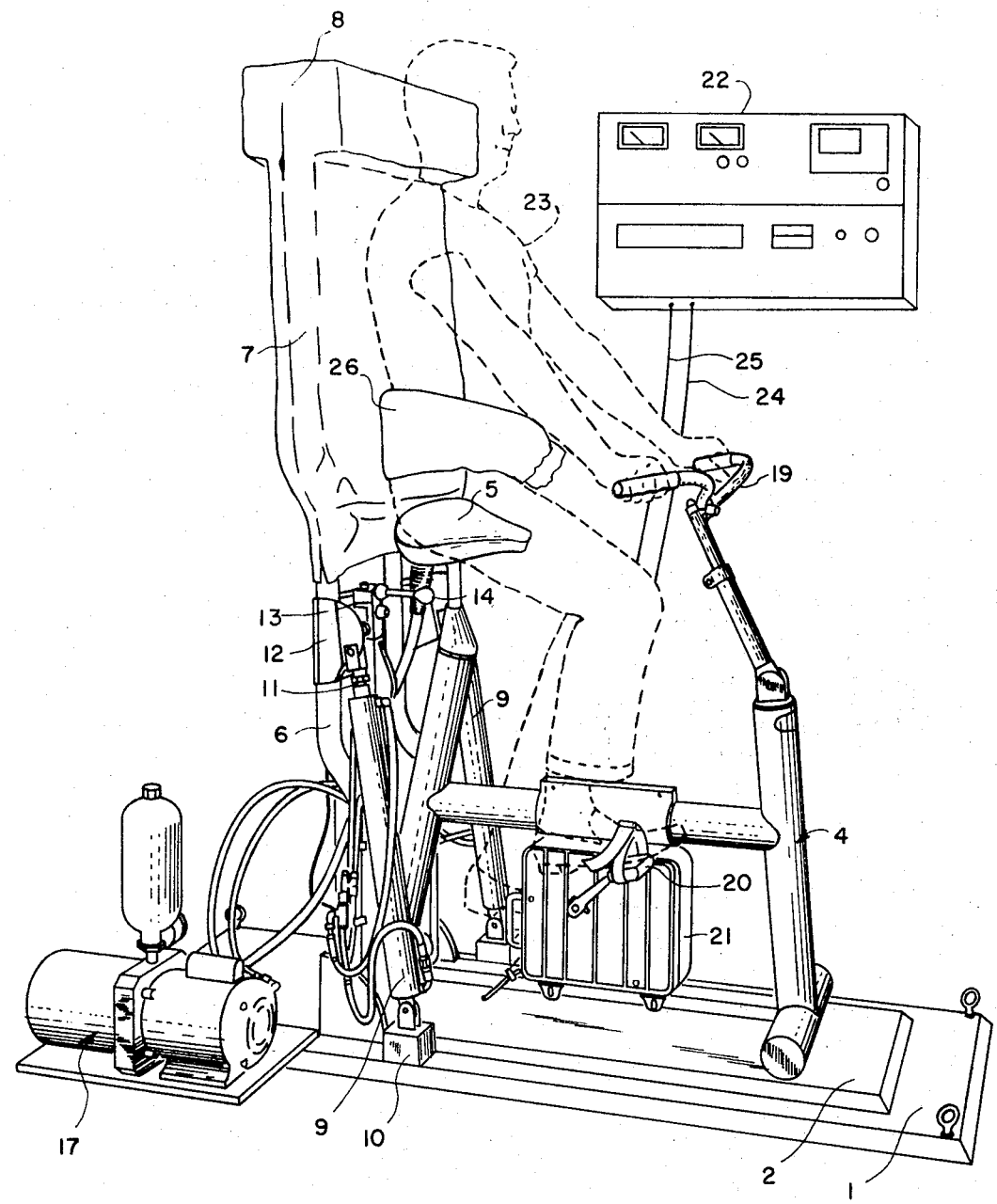
FIG. 1 is a side view of the Tilting Table showing the device in the vertical position.
Figure 3:
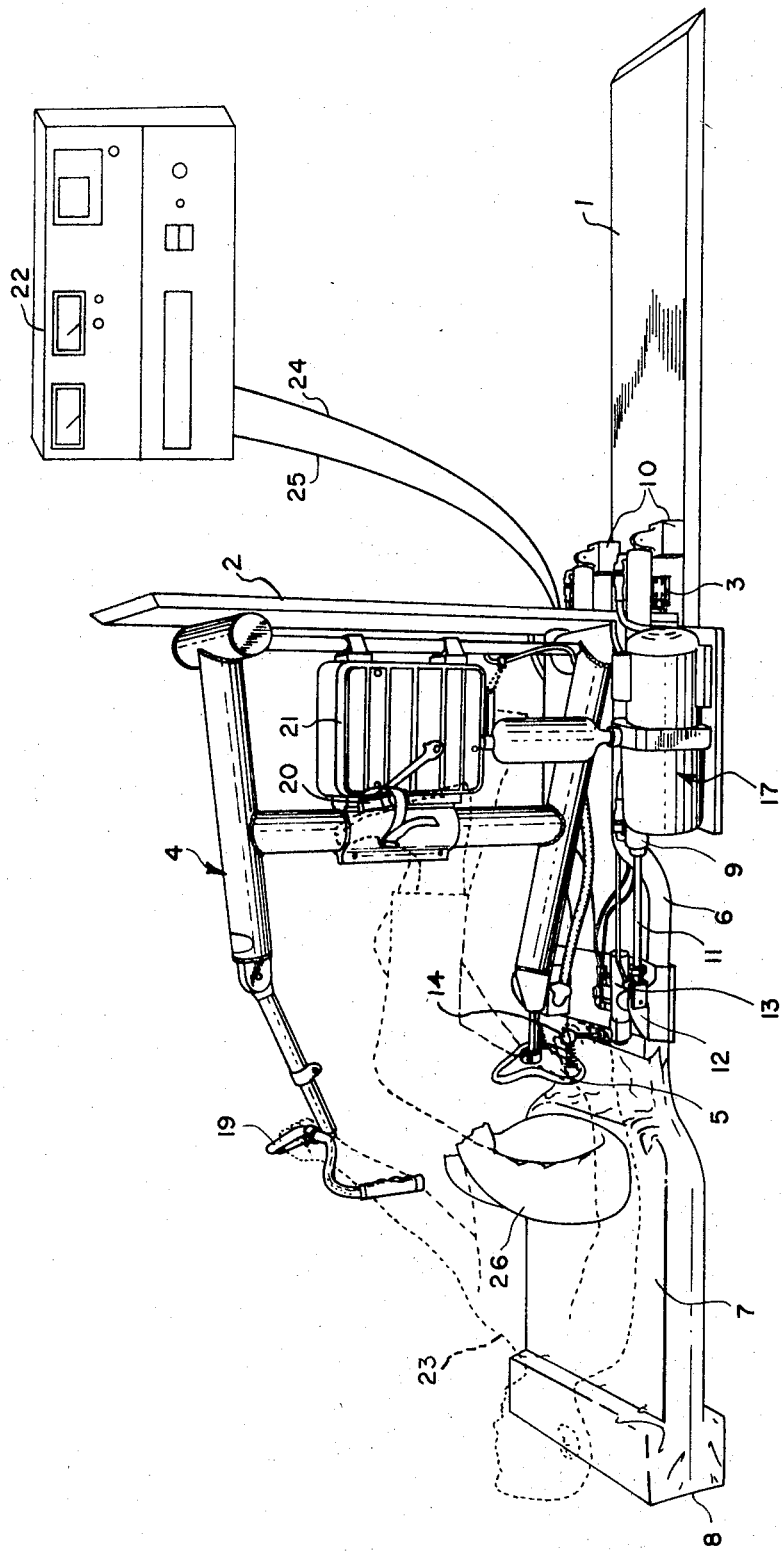
FIG. 3 is a side view of the Tilting Table, showing the device in the horizontal position.

Referring more particularly to the drawings, FIGS. 1, 2 and 3, it can be seen that we have shown an embodiment of the invention using the conventional ergometer as a biomedical device for the purpose of imposing upon the body of a test subject a work load which will be reflected in certain functional changes in the body as it performs work through an angular range from the vertical to the supine.

The device as shown includes a floor plate 1 and a hinged plate 2. The plate 2 is provided with a configuration at its rearward edge forming an upturned flange which will provide a positive stop in the horizontal position as the plate 2 is pivoted about the hinge 3 which fastens it to plate 1 as illustrated.

A tubular frame 6 is welded or otherwise fastened to the plate 2 flush with the plate end at the hinge 3. This tubular frame is in the shape of an inverted U extending to approximately the top of the head of a seated subject, and is expanded in width at about the height of seat 5 which is attached to plate 2 and accommodates the backrest 7. Somewhat below this point it is offset backward to allow for the thickness of the backrest.

The padding of the backrest 7 at the top eight inches or so is brought forward to form a headrest 8. The amount depends upon the softness of the padding, but it should form around the neck and head, and the backrest also should be made of resilient material, such as foam covered with cloth, so that when the body rests against them there is a definite, though small, give which aids in maintaining position, in a semi-contoured manner relative to the subject positioned on the seat 5. In like manner, a projection for the headrest 8 is placed behind the backrest to contact the floor when the device is in the horizontal position, as indicated in FIG. 3.

Dual hydraulic cylinders 9 are flexibly attached to the plate 2 by means of pivotal support blocks 10.

The piston rods 11 working in the cylinders 9 are flexibly attached to an ear 12 formed by a plate tying the two sides of the tubular frame together at a point slightly below the seat 5. The ears 12 and rods 11 are projecting slightly forward of the main body of the frame 6, as indicated in FIGS. 1, 2 and 3.

In the embodiment shown, one of the ears 12, for example near the subject's right hand, supports a two-way hydraulic valve mechanism 13 having a toggle switch or lever 14 adapted to be operated with minimum movement by the hand of the subject 23 (indicated by the dotted lines in normal position on the apparatus); thus allowing the test subject to easily adjust his own angle, by means of the hydraulic system, throughout a range from vertical to supine.

It can readily be seen that the valve mechanism 13 and hand lever 14 can easily be replaced by a remote control valve and lever mechanism 15, as illustrated in FIG. 4, or by a remote control automatic programming device 16 as diagrammatically illustrated in FIG. 5. Thus the subject could be put through all of the angles and also through a cycle of angles over a time period, as might be desired.

The self contained hydraulic system itself, which could consist of a standard motor, pump, secondary reservoir and release valve, is illustrated as shown and designated by the numeral 17.

In the illustration shown, the hinged plate 2 supports an ergometer stand 4, having an adjustable seat 5 and handlebars 19.

To the ergometer stand framework is attached a standard ergometer 21 provided with adjustable strap pedals 20 for operation of the exercising device. The instrumentation shown is a read-out meter system 22 connected by means of electrical leads 24 and 25 to the ergometer 21.

While, with other systems the subject 23 (indicated by dashed lines) might also be equipped with a harness device 26, partially shown, such device is not necessary and eliminated by use of the present apparatus, as will be shown.

In operation, the subject being tested sits as shown in the dashed lines 23 on seat 5, for example, in FIG. 1, in the upright position. His back, at the point of the shoulders, is substantially over hinge 3 which pivots plate 2. His hands rest on the handlebars 19 and his feet engage the pedals 20 of the ergometer 21. The seat 5 acts as a rough index as it projects between the thighs, and the subject's back touches the backrest firmly enough to make an impression in the resilient padding of a foam type which would be adapted to contour to the body; and, likewise, the head makes a cradle at the headrest 8. At this point the neck and shoulders make such an angle with the raised headrest that substantial motion along the lengthwise axis of the subject is restrained. This is also aided by the firm placement of the hands of the subject on the handlebars 19; which, in turn, together with the seat 5 also restrain lateral motion of the body of the subject as exercise is performed on the ergometer.

Now, assuming that the subject is in the position shown in FIG. 1, and is using the hand lever 14 to actuate the hydraulic system, he may with one hand on this lever momentarily actuate the lever in one direction to move the entire apparatus on hinged plate 2 backward through any desired angle. There is very little body motion, aside from that required to pedal the ergometer, exerted in moving the lever 14. The subject may either leave his hand on this lever after he has achieved the desired angle, or may return his hand to the handlebar 19.

In any event, positive stops can be made at any angular position from the vertical to the horizontal, at which point the projecting flange on the hinged plate 2 provides a positive stop in the horizontal position with the subject supine. However, it can readily be seen, also, that as this subject moves through the various angles his body remains indexed in the same relative position with regard to the ergometer. It will be noted that as the subject moves from the vertical to the horizontal position with the apparatus his body line and legs maintain the same relative position, indexed on the seat 5; and the legs of the subject are not placed in a position of further extension, away from the body, as the apparatus tilts backward, nor are they drawn up against his body as the subject moves from the horizontal position to the vertical position, as with other exercise devices heretofore provided.

It is well known that while a subject is exercising in a supine or horizontal position (either with an ergometer or with any other biomedical device), if the trunk of the subject is brought into the vertical position with the attitude of the body so changed that the legs are brought into a position at right angles, or if the legs are brought into position drawn up against the abdomen, the internal organs of the body are so shifted and strains set up on the arterial and venous system such as to cause drastic changes in the heart rate, circulation rate, and metabolic rate of thetest subject. In summary, changing the attitude of the body through certain angles during exercise creates certain external stresses relative to that created by the exercise alone. Therefore, the test data for a subject under such exaggerated conditions with regard to the position of the body in changing movement would be quite different from the conditions which would be found where the body was indexed in the same relative position while exercising, with the entire body attitude being changed through a relative angle of elevation.

It is known that in application to space exploration, an astronaut might be indexed into a fixed position on a couch, while performing exercises as indicated on the apparatus of this invention, with his body attitude relative to the work being done remaining the same, but the overall attitude of his total environment changing relative to the horizontal. It is tests of this nature that are desired to be performed, not only with the ergometer, but with other biomedical devices, maintaining this body attitude, but free from abnormal stresses which might be brought about by drawing the legs up into the trunk and displacing internal organs.

The present invention offers many advantages. The subject may be fully instrumented and tested in any desired position, while producing energy on the ergometer or at rest. This device can be fitted with other biomedical instruments, without the ergometer, or the two can be used in combination. If the ergometer is removed, it is desirable to leave the frame if possible so that the seat and handlebars may be used as described or otherwise substitutes may have to be supplied. It will be readily apparent that with this device no external stresses are put on the body except those occasioned by the driving motion of the legs in propelling the ergometer. The back contour remains the same while exercise can be performed at the various angles. This can be done by operation of the device through the angles by the subject himself, or it can be done by remote control or by a programmed cycling device as indicated in the drawings. Many types of instrumentation can be effected with this apparatus. A treadmill could be substituted for the ergometer with angular adjustment of the seat, and an electrocardiogram or a metabolic analyser could be connected into the sytem.

Thus it will be seen that we have provided an apparatus suitably adapted to meet the objects and features hereinbefore set forth.

From the foregoing it will be seen that the invention is well adapted to attain all of the ends and objects, together with other advantages which are obvious and which are inherent to the structure.

It will be understood that certain features of any subcombinations of the invention are of utility and may be employed without reference to other features and subcombinations. This is contemplated by and is within the scope of the claims.

As many possible embodiments of the invention may be made without departing from the scope thereof, it is to be understood that all matters set forth or shown in the drawings is to be interpreted as illustrative and not in a limiting sense.

Having thus described our invention what is claimed is:

1. In a tilting table for an ergometer and other biomedical devices, designed to test the human body in a variety of positions from vertical to supine, of the character described, the combination comprising:

a floor plate providing a base;

a hinged plate pivotally connected to said floor plate and movable through a predetermined angle;

positive stop means integral with said hinged plate limiting its angular travel;

biomedical testing means mounted on said hinged plate operable by a test subject;

cradling means for said test subject mounted on said hinged plate disposed to maintain substantially the position of the body of said subject while being tested, other than the angularity imparted by the test itself, while said subject operates said testing means;

power means tilting said hinged plate through an angular course of travel such as to move the body attitude of the test subject from the vertical to the supine;

and actuating means for said power means to selectively control the tilting movement of said hinged plate during a test.

2. Apparatus of the character described in claim 1, wherein said hinged plate comprises an elongated stand hinged at one end to said floor plate and movable to describe an arc of 90° relative to said floor plate.

3. Apparatus of the character described in claim 1, wherein said stop means on said hinged plate comprises a vertically disposed flange at the pivotal end of said plate having an occluding edge relative to said floor plate restricting angular travel of said hinged plate.

4. Apparatus of the character described in claim 1, wherein said biomedical testing means comprises an ergometer with a stand and handlebars mounted on said hinged plate; pedals on said ergometer supporting the feet of a test subject; a seat connected to said stand supporting said subject with said handlebars while operating said ergometer; and read out instrumentation connected to said subject and ergometer.

5. Apparatus of the character described in claim 1, wherein said cradling means comprises:
  a saddle seat projecting between the thighs affixed to said hinged plate;
  a bar support for the hands integral therewith;
  a frame projecting substantially at right angles from the pivotal end of said hinged plate and rearwardly of said seat;
  a padded back rest of resilient material supported by said frame, yieldably contouring itself to the body of said test subject;
  a head rest affixed to said back rest in raised contour supporting the head and nesting the shoulders;
  said back and head rest cooperating to index a test subject on said seat such as to maintain said body position in substantially the same relative attitude thereto, through all degrees of angularity imparted to said hinged plate, from vertical to supine.

6. Apparatus of the character described in claim 1, wherein said power means comprises a hydraulic piston and cylinder system operably connected between said floor plate and hinged plate assembly such as to pivotally urge said hinged plate in reciprocal movement from flush position to one at right angles thereto when actuated.

7. Apparatus of the character described in claim 1, wherein said actuating means comprises a manually operated two-way switch mounted in juxtaposition to said cradling means such as to be operable by one hand of said test subject while maintaining the remainder of the body of said subject in test mode.

8. Apparatus of the character described in claim 1, wherein said actuating means comprises a remote control switch for said power means operable by one other than said test subject.

9. Apparatus of the character described in claim 1, wherein said actuating means comprises a remote control automatically programmed switch for said power means operable to program said tilting mechanism through a predetermined cycle of movement.

* * * * *